(12) United States Patent
Challand et al.

(10) Patent No.: US 9,267,418 B2
(45) Date of Patent: Feb. 23, 2016

(54) EXHAUST GAS SYSTEM FOR AN INTERNAL COMBUSTION ENGINE

(71) Applicant: Universitaet Stuttgart, Stuttgart (DE)

(72) Inventors: Sebastian Challand, Stuttgart (DE); Eckart Dirschauer, Stuttgart (DE)

(73) Assignee: Universitaet Stuttgart, Stuttgart (DE)

( * ) Notice: Subject to any disclaimer, the term of this patent is extended or adjusted under 35 U.S.C. 154(b) by 0 days.

(21) Appl. No.: 14/390,074

(22) PCT Filed: Apr. 4, 2013

(86) PCT No.: PCT/EP2013/057085
§ 371 (c)(1),
(2) Date: Oct. 2, 2014

(87) PCT Pub. No.: WO2013/150092
PCT Pub. Date: Oct. 10, 2013

(65) Prior Publication Data
US 2015/0052882 A1  Feb. 26, 2015

(30) Foreign Application Priority Data

Apr. 5, 2012 (EP) .................. 12163331

(51) Int. Cl.
*F01N 1/00* (2006.01)
*F01N 13/10* (2010.01)
(Continued)

(52) U.S. Cl.
CPC ............ *F01N 13/105* (2013.01); *F01N 13/107* (2013.01); *F02B 37/02* (2013.01); *F02B 37/025* (2013.01); *F02B 37/22* (2013.01);
(Continued)

(58) Field of Classification Search
USPC ........... 60/274, 278, 280, 285, 287, 288, 289, 60/291, 292, 324, 605.2, 612
See application file for complete search history.

(56) References Cited

U.S. PATENT DOCUMENTS 4,813,232 A * 3/1989 Hitomi et al. ................... 60/313
6,260,358 B1 7/2001 Daudel et al.
(Continued)

FOREIGN PATENT DOCUMENTS

DE  10 04 861 B  3/1957
DE  34 39 999 C1  5/1986
(Continued)

OTHER PUBLICATIONS

International Search Report of PCT/EP2013/057085, mailed Jun. 19, 2013.

*Primary Examiner* — Binh Q Tran
(74) *Attorney, Agent, or Firm* — Collard & Roe, P.C.

(57) ABSTRACT

An exhaust gas system for an internal combustion engine includes at least one first and one second exhaust gas connection interface for fluidically separated discharge of exhaust gas arising during a combustion process from a combustion chamber of the internal combustion engine, and one at least dual-pipe exhaust gas turbocharger having at least one first and one second supply connection interface for fluidically separated supply of the exhaust gases arising during the combustion process, wherein a first connecting channel is designed for fluidic connection of the first exhaust gas connection interface to the first supply connection interface, and a second connecting channel is designed for fluidic connection of the second exhaust gas connection interface to the second supply connection interface. At least one of the connecting channels is designed to be at least partially closable by a closure element.

9 Claims, 1 Drawing Sheet

(51) Int. Cl.
  *F02B 37/02* (2006.01)
  *F02B 37/22* (2006.01)
  *F02C 6/12* (2006.01)
  *F02F 1/42* (2006.01)

(52) U.S. Cl.
  CPC .. *F02C 6/12* (2013.01); *F02F 1/42* (2013.01); *F05D 2220/40* (2013.01); *Y02T 10/144* (2013.01)

(56) References Cited

U.S. PATENT DOCUMENTS 8,316,642 B2 * 11/2012 McEwan et al. ............... 60/612
8,516,814 B2 * 8/2013 Okada ............... 60/602
8,567,189 B2 * 10/2013 Styles et al. ............... 60/602
8,612,118 B2 * 12/2013 Elsa.beta.er ............... 701/103
8,671,682 B2 * 3/2014 Parlow et al. ............... 60/612
9,051,903 B2 * 6/2015 Wolk ............... 60/605.2

FOREIGN PATENT DOCUMENTS

| DE | 199 18 232 A1 | 11/2000 |
| DE | 10 2007 037 540 A1 | 2/2009 |
| DE | 10 2008 052088 A1 | 4/2010 |
| DE | 10 2009 050 952 A1 | 5/2011 |
| FR | 2 844 552 A1 | 3/2004 |

* cited by examiner

EXHAUST GAS SYSTEM FOR AN INTERNAL COMBUSTION ENGINE

CROSS REFERENCE TO RELATED APPLICATIONS

This application is the National Stage of PCT/EP2013/057085 filed on Apr. 4, 2013, which claims priority under 35 U.S.C. §119 of European Application No. 12163331.7 filed on Apr. 5, 2012, the disclosure of which is incorporated by reference. The international application under PCT article 21(2) was not published in English.

BACKGROUND OF THE INVENTION

1. Field of the Invention

The invention relates to an exhaust gas system for an internal combustion engine.

2. Description of the Related Art

An exhaust gas system for an internal combustion engine of the type named in the introduction is known according to DE 10 2009 050 952. This consists, with reference to FIG. 3 of this document and in relation to a cylinder of the internal combustion engine or respectively reciprocating piston engine, of at least one first and one second exhaust has connection interface for fluidically separated discharge of exhaust gas arising during a combustion process from a combustion chamber (firing chamber) of the internal combustion engine and of one at least dual-pipe exhaust gas turbocharger, having at least one first and one second supply connection interface for fluidically separated supply of the exhaust gases arising during the combustion process, wherein a first connecting channel is designed for fluidic connection of the first exhaust gas connection interface to the first supply connection interface, and a second connecting channel is designed for fluidic connection of the second exhaust gas connection interface to the second supply connection interface. In the solution according to FIG. 3 of DE 10 2009 050 952 A1, four combustion chambers (cylinders) are provided, wherein in addition each combustion chamber is provided with a first and with a second exhaust gas connection interface. Adjoining these exhaust gas connection interfaces are connecting channels, which are connected to precisely a first and precisely a second supply connection interface of the exhaust gas turbocharger. The connection of a total of eight exhaust gas connection interfaces on the internal combustion engine to a total of two supply connection interfaces on the exhaust gas turbocharger comes about here in that respectively four connecting channels of the first or respectively second exhaust gas connection interface are designed so as to be brought together before reaching the first or respectively second supply connection interface.

SUMMARY OF THE INVENTION

The invention is therefore based on the problem of improving an exhaust gas system for an internal combustion engine of the type named in the introduction.

This problem is solved with an exhaust gas system for an internal combustion engine of the type named in the introduction by the features described herein.

According to the invention, provision is therefore made that at least one of the connecting channels is designed to be at least partially closable by means of a closure element.

In other words, provision is made according to the invention to influence the action upon the exhaust gas turbocharger via the opening and closing of the connecting channels. This measure makes it possible to operate the exhaust gas turbocharger in at least two stages with different exhaust gas mass flows and therefore with different rotation speeds of the internal combustion- or respectively reciprocating piston engine, wherein according to the invention, as will be explained in further detail, also more than two exhaust gas connection interfaces, connecting channels, supply connection interfaces can be provided per cylinder. If, for example, three connecting channels are provided per cylinder, the exhaust gas turbocharger can be acted upon with a low exhaust gas mass flow (i.e. with a low rotation speed) via only one supply connection interface per cylinder, with a medium exhaust gas mass flow (i.e. with a medium rotation speed) via two supply connection interfaces per cylinder, and with a high exhaust gas mass flow (i.e. a high rotation speed) via three supply connection interfaces per cylinder. The action upon the exhaust gas turbocharger therefore takes place as a function of the exhaust gas mass flow, wherein the described gradation becomes all the more uniform, the more connecting channels are provided overall per cylinder. Oriented to the typically conventional space conditions in an internal combustion engine, two connecting channels per cylinder are the minimum for realizing the solution according to the invention, three connecting channels per cylinder are a reasonable mean and four connecting channels per cylinder are certainly already in the border area between cost and benefit.

To summarize again briefly, for the solution according to the invention at least two connecting channels must be provided per cylinder, at least one of the connecting channels per cylinder must be designed to be (at least partially) closable, and the exhaust gas turbocharger is to have at least twice as many supply connection interfaces (also designated as flows) as the internal combustion has cylinders altogether.

The term "exhaust gas connection interface" used in claim 1 comprises here at least the following options:

In an internal combustion engine with one outlet valve per cylinder, a flow divider (for example belonging to the exhaust gas system) is arranged downstream of this outlet valve, which flow divider divides the exhaust gas mass flow into at least two partial flows. The exhaust gas connection interfaces are situated here precisely at the site of the division.

In an internal combustion engine with two (or more) outlet valves per cylinder, the exhaust gas connection interfaces are arranged practically directly at the cylinder head of the internal combustion engine, because no further flow divider is necessary, in order to distribute the exhaust gas mass flow to two (or more) exhaust gas connection interfaces.

In the case where in fact two outlet valves are present per cylinder, but at the same time three exhaust gas connection interfaces are to be provided, a flow divider would be provided again, which provides the three exhaust gas connection interfaces on the basis of two outlet valves.

The measure "at least partially", defined in the characterizing clause of claim 1, takes into consideration the option that the action upon the exhaust gas turbocharger can also be continuously increased or respectively reduced between the individual stages, if required, by means of the closure element.

Furthermore, the measure of closability of a connecting channel means merely that via this connecting channel in the completely closed state no exhaust gas can be directed to the exhaust gas turbocharger. This measure does not rule out that the exhaust gas is directed for example past the exhaust gas turbocharger (bypassed) to the actual exhaust pipe.

The solution according to the invention has the advantage that the impulse energy of the exhaust gas can be utilized particularly well, because the action upon of the exhaust gas turbocharger takes place as a function of the actual exhaust gas mass flow. Here, as will be explained more precisely below, within the exhaust gas turbocharger fixed angles of incidence (without additional guide vanes or suchlike) are provided for the exhaust gas onto the runner, i.e. the geometry of the housing of the exhaust gas turbocharger can be configured particularly simply (as is likewise explained in more detail below). Moreover, the opening and closing of the connecting channels takes place particularly preferably with valves or suchlike, which are arranged outside the exhaust gas turbocharger and therefore outside the thermally most stressed region.

Other advantageous further developments of the exhaust gas system for an internal combustion engine according to the invention will emerge from the dependent claims.

For the sake of completeness, reference is also made to DE 10 2007 037 540 A1. In this solution, a tubular nozzle with changeable nozzle geometry is arranged between the internal combustion engine and the exhaust gas turbocharger in the (single!) connecting line. The adjustable outlet cross-section of the nozzle allegedly makes it possible, in the case of small exhaust gas mass flows, for example with partial load or with low rotation speeds of the internal combustion engine, to increase the proportion of the kinetic pressure of the exhaust gas compared with the proportion of the static pressure by constricting the nozzle cross-section, whilst it is possible, vice versa, with large exhaust gas mass flows, for example in full-load operation or with high rotation speeds of the internal combustion engine, to provide for a low pressure loss in the region of the nozzle by expanding the outlet cross-section. However, the applicant assumes that the nozzle effect which is aimed for is dissipated even before the flow has reached the runner of the exhaust gas turbocharger, that is to say that ultimately this arrangement only leads to an entropy increase over the stage.

The exhaust gas system for an internal combustion engine according to the invention, including its advantageous further developments according to the dependent claims, is explained in further detail below with the aid of the illustration of various example embodiments by drawings.

BRIEF DESCRIPTION OF THE DRAWINGS

There are shown diagrammatically

DETAILED DESCRIPTION OF THE PREFERRED EMBODIMENTS

Figures 1, 2:
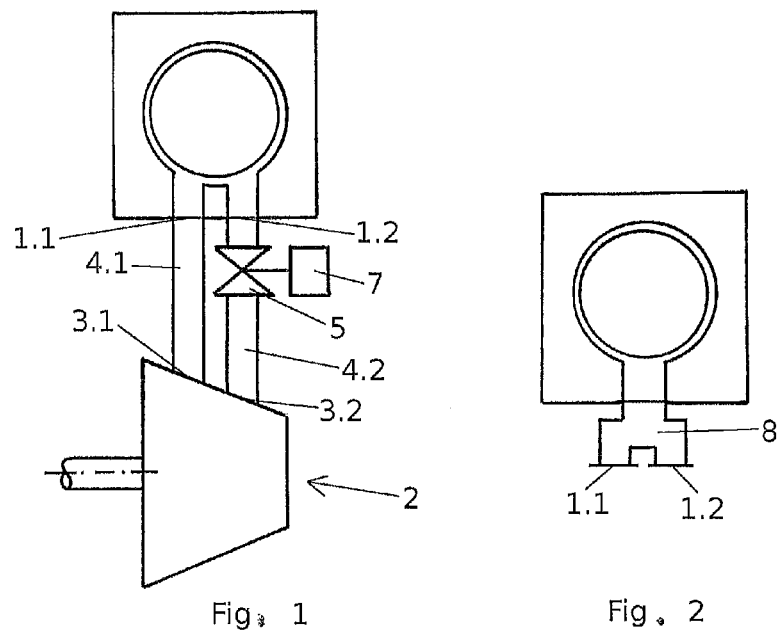
FIG. 1 the exhaust gas system according to the invention for a single-cylinder internal combustion engine with two outlet channels, one connecting element and one dual-pipe exhaust gas turbocharger (only partially illustrated)
FIG. 2 a single-cylinder internal combustion engine with an outlet channel and an adapter element (flow divider) for the construction of a first and a second exhaust gas connection interface.

All the embodiments of the exhaust gas system for an internal combustion engine, illustrated in the figures, consist of at least one first and one second exhaust gas connection interface 1.1, 1.2 for fluidically separated discharge of exhaust gas arising during a combustion process from a combustion chamber of the internal combustion engine, and one at least dual-pipe exhaust gas turbocharger 2, having at least one first and one second supply connection interface 3.1, 3.2 for fluidically separated supply of the exhaust gases arising during the combustion process, wherein a first connecting channel 4.1 is designed for fluidic connection of the first exhaust gas connection interface 1.1 to the first supply connection interface 3.1, and a second connecting channel 4.2 is designed for fluidic connection of the second exhaust gas connection interface 1.2 to the second supply connection interface 3.2.

It is essential now for the exhaust gas system according to the invention that at least one of the connecting channels 4.1, 4.2 is designed to be at least partially closable by means of a closure element 5. With regard to the high temperature stress, provision is made here particularly preferably that the closure element 5 is constructed as a slider which is able to be introduced into the connecting channel 4.1, 4.2.

In FIG. 1 firstly for ease of understanding of the invention, an embodiment of a single-cylinder internal combustion engine is illustrated diagrammatically which, for example because in addition to two inlet valves also two outlet valves are provided (Keyword: four valves per cylinder), has two outlet openings at the cylinder head. Adjoining these two outlet openings, which in this case form the exhaust gas connection interfaces 1.1, 1.2, are a total of two connecting channels 4.1, 4.2, which in turn are connected to the two supply connection interfaces 3.1, 3.2 of the exhaust gas turbocharger 2, which in this case is of dual pipe construction. One of the two connecting channels 4.2 is provided with the closure element 5 according to the invention, which in turn is constructed so as to be operable via an actuator 7. The closure element 5 (in all embodiments) can be optionally opened completely, closed completely, but also positioned in any intermediate position. For this, each closure element 5, which is preferably provided with an actuator 7, is constructed so as to be connected to a superordinate control unit (not illustrated extra).

In FIG. 2 likewise a single-cylinder internal combustion engine is illustrated diagrammatically; this, however, has only one outlet opening at its cylinder head. In order to nevertheless have at least two exhaust gas connection interfaces 1.1, 1.2 available, i.e. when the first and second exhaust gas connection interface 1.1, 1.2 can not be constructed so as to be connected directly to corresponding outlet openings arranged externally at the cylinder head of the internal combustion engine, an adapter element 8 can be provided according to the invention, which in the illustrated example embodiment connects the outlet opening to two exhaust gas connection interfaces 1.1, 1.2. Alternatively, (not illustrated extra), the adapter element 8 could, however, also connect the outlet opening to three exhaust gas connection interfaces. Furthermore, an adapter element 8 is also possible, for example, which connects two outlet openings to three exhaust gas connection interfaces.

Figure 3:
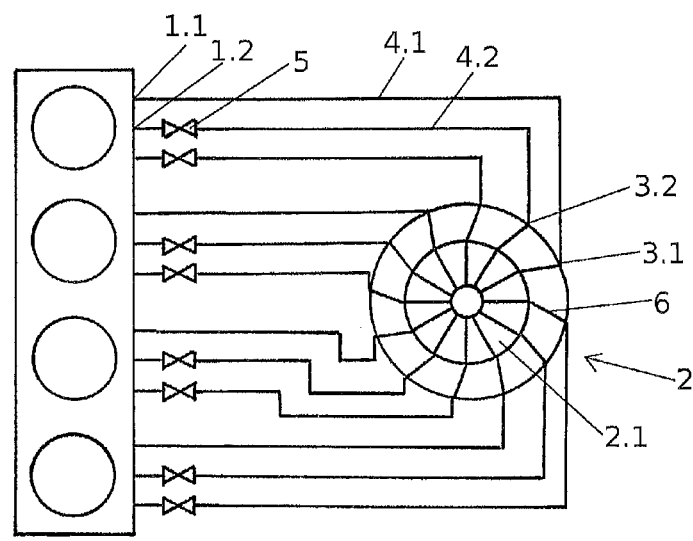
FIG. 3 the exhaust gas system according to the invention for a four-cylinder internal combustion engine with three connecting channels per cylinder, a total of eight closure elements and one twelve-pipe exhaust gas turbocharger.

In FIG. 3, a practice-oriented solution of the solution according to the invention is illustrated diagrammatically. This shows a four-cylinder internal combustion engine with three connecting channels per cylinder and a twelve-pipe exhaust gas turbocharger 2. As can be seen, respectively two of three connecting channels of a combustion chamber are provided with a closure element 5. Expressed more generally, provision is made according to the invention that with a quantity of m connecting channels 4.1, 4.2 per combustion chamber, at least m−1 and a maximum of m closure elements 5 are provided. The measure "maximum of m" expresses here that, if desired and expedient, also each connecting channel can be provided with a closure element 5. Here, also, as previously mentioned, provision can be made (typically via a further exhaust gas connection interface, not illustrated extra here) that the exhaust gas for example is directed past the exhaust has turbocharger 2 (bypassed) to the actual exhaust pipe of the internal combustion engine.

Furthermore, provision is preferably made that with several combustion chambers respectively precisely one closure element 5 of one combustion chamber is constructed so as to be actuatable together with respectively precisely one closure element 5 of the other combustion chambers. With reference to FIG. 3, this means: The connecting channels 4.1 are always opened, as they do not have a closure element 5. With low output or respectively a low rotation speed, the remaining closure elements 5 are closed. If the rotation speed is now increased, the aim of the invention consists in keeping the mass flow per supply connection interface as constant as possible, i.e. according to the invention at least one further closure element 5 is opened per combustion chamber. Under full load, accordingly all closure elements 5 are opened, i.e. the exhaust gas is directed in distributed manner via all connecting channels 4.1, 4.2 to the exhaust gas turbocharger 2.

As can be seen, the measure that the closure element 5 is constructed so as to be adjustable as a function of a rotation speed of the internal combustion engine, results in the impulse of the exhaust gas being maintained and being able to be better used by the exhaust gas turbocharger 2, wherein at the same time costly, adjustable vanes on the exhaust gas turbocharger 2 can be dispensed with, which will be discussed further below. As already explained in the introduction, according to the invention at least two connecting channels are necessary per combustion chamber. FIG. 3 shows an embodiment with three connecting channels per cylinder. Four connecting channels per cylinder are also easily conceivable; with five and more connecting channels, the ratio between cost and benefit may then conceivably be no longer advantageous, even though such a solution also lies within the scope of the invention.

As can be seen furthermore from FIGS. 1 and 3, provision is made according to the invention that the closure element 5, viewed in the extent direction of the connecting channel 4.1, 4.2, is arranged nearer to the exhaust gas connection interface 1.1, 1.2 than to the supply connection interface 3.1, 3.2. This measure has the advantage that the regulating components (in particular the closure elements 5 and the actuators 7) for the distribution of the exhaust gas flow are arranged outside of the housing of the exhaust gas turbocharger, which leads to a reduction in costs and to an increase of the lifespan of the charger.

Furthermore, provision is made according to the invention that with a quantity of n combustion chambers, at least 2*n connecting channels 4.1, 4.2 are provided. With respect to the example embodiment in FIG. 3, provision is made in practice that four combustion chambers (n=4) are connected to a total of twelve (i.e. 3*n) connecting channels.

In order to be able to utilize the impulse energy of the exhaust gas, as mentioned, as optimally as possible, furthermore a through-flow cross-section of the connecting channel 4.1, 4.2 between the exhaust gas connection interface 1.1, 1.2 and the supply connection interface 3.1, 3.2 is constructed so as to be consistent, i.e. the through-flow cross-section preferably remains of equal size on the entire length of the connecting channel.

Furthermore, as can be seen from the figures, provision is preferably made that a total number of exhaust gas connection interfaces 1.1, 1.2 at the exhaust gas system corresponds precisely to a total number of supply connection interfaces 3.1, 3.2 at the exhaust gas turbocharger 2.

With regard to the exhaust gas turbocharger 2, which according to the invention (and in contrast to the internal combustion engine) belongs to the exhaust gas system, and which can optionally be constructed as a radial (illustrated) or as an axial turbine (not illustrated), provision is preferably further made that by means of a flow channel 6 arranged between the supply connection interface 3.1, 3.2 and a runner 2.1 of the exhaust gas turbocharger 2, an unchangeable angle of incidence onto the runner 2.1 is set, wherein the latter (in relation to a circle tangent positioned at the edge of the runner 2.1) is preferably between 65° and 75°, particularly preferably, and as illustrated, 70°. In other words, the exhaust gas turbocharger 2 according to the invention can be constructed free of vanes, wherein furthermore, to maintain the impulse energy, preferably provision is made that the flow channel 6 has the same through-flow cross-section as the connecting channel 4.1, 4.2.

Finally, firstly expressed in general terms, provision is preferably made that connecting channels 4.1, 4.2 belonging respectively to different combustion chambers, for the uniform action upon the turbocharger 2, are constructed connected to supply connection interfaces 3.1, 3.2 which are arranged axially symmetrically to the rotation axis of a runner 2.1 of the exhaust gas turbocharger 2. In relation to the example embodiment according to FIG. 3, this measure means in practice that for example the connecting channels of the third combustion chamber (counted from the top) are constructed opening offset by 180° to the connecting channels of the first combustion chamber at the exhaust gas turbocharger 2. The same applies accordingly for the connecting channels or respectively supply connection interfaces of the second and fourth combustion chamber, wherein the specific angle obviously depends on how many combustion chambers the internal combustion engine has and how many exhaust gas connection interfaces are provided per combustion chamber.

LIST OF REFERENCE NUMBERS 1.1 exhaust gas connection interface
1.2 exhaust gas connection interface
2 exhaust gas turbocharger
2.1 runner
3.1 supply connection interface
3.2 supply connection interface
4.1 first connecting channel
4.2 second connecting channel
5 closure element
6 flow channel
7 actuator
8 adapter element

The invention claimed is:
1. An exhaust gas system for an internal combustion engine, comprising
  at least one first and one second exhaust gas connection interface for fluidically separated discharge of exhaust gas arising during a combustion process from a combustion chamber of the internal combustion engine, and
  one at least dual-pipe exhaust gas turbocharger having at least one first and one second supply connection interface for fluidically separated supply of the exhaust gases arising during the combustion process,
  wherein a first connecting channel is designed for fluidic connection of the first exhaust gas connection interface to the first supply connection interface, and a second connecting channel is designed for fluidic connection of the second exhaust gas connection interface to the second supply connection interface, wherein at least one of the connecting channels is designed to be at least partially closable by via a closure element, and wherein with a quantity of n combustion chambers, at least 2*n connecting channels are provided.

2. The exhaust gas system for an internal combustion engine according to claim 1, wherein with a quantity of m connecting channels per combustion chamber, at least m−1 and a maximum of m closure elements are provided.

3. The exhaust gas system for an internal combustion engine according to claim 1, wherein with several combustion chambers, respectively precisely one closure element of one combustion chamber is constructed so as to be actuatable together with respectively precisely one closure element of the other combustion chambers.

4. The exhaust gas system for an internal combustion engine according to claim 1, wherein the closure element is constructed so as to be adjustable as a function of a rotation speed of the internal combustion engine.

5. The exhaust gas system for an internal combustion engine according to claim 1, wherein the closure element, viewed in the extent direction of the connecting channel is arranged nearer to the exhaust gas connection interface than to the supply connection interface.

6. The exhaust gas system for an internal combustion engine according to claim 1, wherein a through-flow cross-section of the connecting channel between the exhaust gas connection interface and the supply connection interface is constructed so as to be consistent.

7. The exhaust gas system for an internal combustion engine according to claim 1, wherein a total number of exhaust gas connection interfaces at the exhaust gas system corresponds precisely to a total number of supply connection interfaces at the exhaust gas turbocharger.

8. The exhaust gas system for an internal combustion engine according to claim 1, wherein connecting channels belonging respectively to different combustion chambers, for the uniform action upon the turbocharger, are constructed connected to supply connection interfaces which are arranged axially symmetrically to the rotation axis of a runner of the exhaust gas turbocharger.

9. The exhaust gas system for an internal combustion engine according to claim 1, wherein via a flow channel arranged between the supply connection interface and a runner of the exhaust gas turbocharger, an unchangeable angle of incidence onto the runner is set, and wherein the angle of incidence is preferably between 65° and 75°, in particular 70°.

* * * * *